J. W. FOARD.
Chimney Cap.
No. 79,820.
Patented July 14, 1868
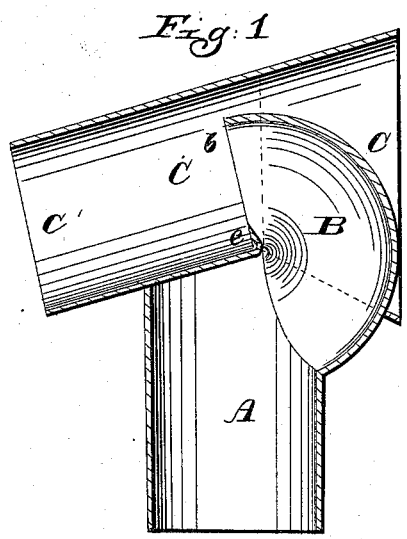
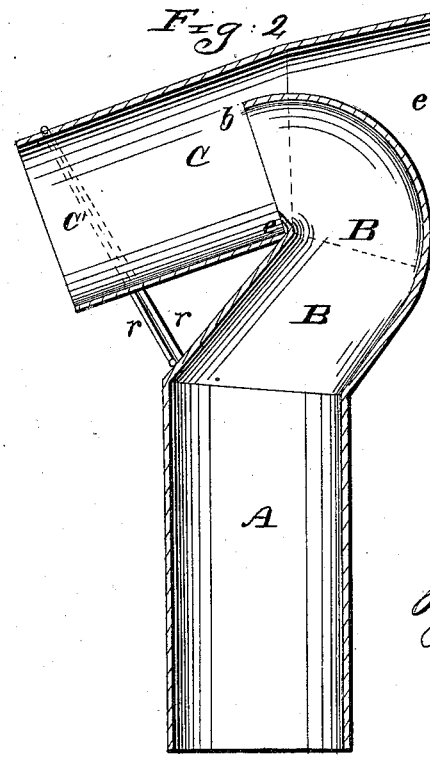
Witnesses:
Inventor:

United States Patent Office.

J. W. FOARD, OF SAN FRANCISCO, CALIFORNIA.

*Letters Patent No. 79,820, dated July 14, 1868.*

IMPROVEMENT IN VENTILATORS.

*The Schedule referred to in these Letters Patent and making part of the same.*

TO ALL WHOM IT MAY CONCERN:

Be it known that I, J. W. FOARD, of the city and county of San Francisco, and State of California, have invented a new and useful Improvement in Ventilators; and I do hereby declare that the following is a full, clear, and exact description of the construction and operation of the same, reference being had to the annexed drawings, making a part of this specification, in which—

Figure 1 is a longitudinal vertical section.

Figure 2 is a similar section—

The two figures representing different forms of my improved ventilator.

The object of this invention is to furnish an improved ventilator for ships, buildings, cars, &c., which, while affording a thorough ventilation to the ship or building upon which it is used, entirely prevents the rain from entering through the ventilator.

To this end the invention consists in the peculiar arrangement of the pipes and cowl, as hereinafter described, and in the employment of an elongated cylindrical or parallel-sided discharge-pipe, instead of the funnel-form discharge-pipe heretofore used.

In the drawings, A represents an upright pipe, which may be supported on a spindle, so as to rot te freely upon it, or, when used on ships, may be attached to a deck-pipe, by which it can be turned in any direction by hand, and caused to remain in one position until moved round to another.

C is a cowl, having an expanded or funnel-form mouth, c, which stands towards the wind, and a smaller inclined portion, c', which is turned from the wind. The part c' is cylindrical or parallelopipedon in shape, and is considerably elongated. This cowl, thus constructed, is fitted upon the top of the pipe A, so as to turn with it, its centre coming as nearly as possible over the centre of the pipe, by which it will be more perfectly balanced, and will, at the same time, turn in a smaller circle, causing the whole apparatus to occupy less space.

B is a bent tube, which springs from the top of the upright tube and bends outward, then upward, and finally inward, in a regular curve, forming a curved passage from the pipe A to the cowl C, through which the current of impure air passes, rising through the pipes A and B, and being discharged from the end, c', of the cowl. This current is generated by the force of the wind blowing into the mouth c, and passing over and around the end of the curved connecting-pipe.

The cowl may rest directly upon the upper end of the pipe A, the curved pipe B forming a passage from one to the other, as shown in fig. 1, or the pipe B may be made longer, and inclined as represented in fig. 2, so as to form the support for the cowl, as there shown. In the latter case, stout rods or braces, r r, may be employed to support the end c'.

In either case, the parts being constructed in about the proportions shown in the drawings, and the cowl C arranged at the proper inclination from the end of pipe B to the discharge-end c', it will be nearly impossible for rain to be driven into the cowl with sufficient force to carry it into the vertical pipe A. In order to insure preventing the water from entering the pipe under any circumstances, I so attach the pipe B and cowl together that a wall, e, from half an inch to an inch in height, shall be left beneath the open upper end of the curved pipe, forming a barrier, which will intercept the water, should the wind drive any up the inclined bottom of the cowl, and will entirely prevent its working over into the vertical pipe.

The upper edge of the pipe B, at its discharge-end, is made to project slightly beyond the lower edge, as seen at b, in order that the moisture, driven in at the funnel-end of the cowl, may drip upon the inclined surface below the bridge or wall e, and may not be conducted back into the vertical pipe.

Besides the peculiar shape and arrangement of the several parts of this ventilator, for the purpose of completely excluding rain or cinders from the vertical pipe, the form of the discharge-pipe or discharge-end c' of the cowl, insures a strong current of air from and through the vertical pipe, by means of so confining the air, in its passage through pipe c, as that, by pressure upon and consequent friction upon the air opposite the opening in the vertical pipe, atmospheric pressure is in a degree removed from the opening in said vertical pipe, thus allowing air to rush up through said latter pipe from the point to be ventilated. This form, it will be observed, is that of an elongated pipe or tube, having parallel sides, a cylinder, or a parallelopipedon. All other ventilators heretofore in use have their discharge-pipe flaring or funnel-form. The difference is radical and of the utmost importance. In order to suck or draw the air up from the vertical pipe, it is necessary that the whole mass of air in the elongated discharge-pipe should be set in motion, and should exert its momentum upon the air behind it, drawing such air after it, and causing a rush from the vertical pipe to supply its place.

A slight breath of air blowing into the expanded end of the cowl will start the body of air in the tube $c'$, and create quite a draught up the pipe B, provided the pipe $c'$ be of the form described, and of such length that the current, entering at the funnel end, shall not be allowed to escape till it has put in motion all the air in said pipe $c$. If the discharge-pipe be expanded, or, what is equivalent thereto, be very short, no such effect will take place, or the effect will be very greatly diminished. The elongated parallel-sided discharge-tube $c'$ is absolutely necessary for the production of a sufficient vacuum, by the motion of its contents, to produce the desired results.

I do not claim as my invention any arrangement of pipes and cowl in which the discharge-pipe is made in any other form than that of a cylinder or parallel-sided pipe or tube, but Having described my invention, what I do claim as new, and desire to secure by Letters Patent, is—

The ventilator, composed essentially of the pipe A and cowl C, united by the connection-pipe B, the cowl having the expanded end $c$, to receive the air to create the current, and the elongated cylindrical or parallelopipedon discharge-end $c'$, for the purpose described, all the said parts being constructed and arranged to operate together, substantially in the manner specified.

To the above specification of my invention I have signed my hand, this twelfth day of February, 1868.

J. W. FOARD.

Witnesses:
OTIS V. SAWYER,
F. H. WOODS.